US007263558B1

(12) United States Patent
Khirman et al.

(10) Patent No.: US 7,263,558 B1
(45) Date of Patent: Aug. 28, 2007

(54) METHOD AND APPARATUS FOR PROVIDING ADDITIONAL INFORMATION IN RESPONSE TO AN APPLICATION SERVER REQUEST

(75) Inventors: Stanislav Khirman, Mountain View, CA (US); Mark Ronald Stone, Palo Alto, CA (US); Oren Arial, Sunnyvale, CA (US); Ori Cohen, San Francisco, CA (US)

(73) Assignee: Narus, Inc., Mountain View, CA (US)

( * ) Notice: Subject to any disclaimer, the term of this patent is extended or adjusted under 35 U.S.C. 154(b) by 0 days.

(21) Appl. No.: 09/397,491

(22) Filed: Sep. 15, 1999

(51) Int. Cl.
*G06F 15/16* (2006.01)
*G06F 11/00* (2006.01)

(52) U.S. Cl. ....................................... 709/229; 714/100

(58) Field of Classification Search ............ 705/50–54, 705/26; 709/224, 229; 713/201
See application file for complete search history.

(56) References Cited

U.S. PATENT DOCUMENTS 4,672,572 A * 6/1987 Alsberg ...................... 713/202
4,817,080 A 3/1989 Soha ........................... 370/17
4,823,310 A 4/1989 Grand
5,101,402 A 3/1992 Chiu et al.
5,159,685 A 10/1992 Kung ......................... 395/575
5,197,127 A 3/1993 Waclawsky et al. ........ 395/200
5,247,517 A 9/1993 Ross et al. ................. 370/85.5

(Continued)

FOREIGN PATENT DOCUMENTS

JP 60-191322 9/1985

(Continued)

OTHER PUBLICATIONS

Jeffrey K. MacKie-Mason and Hal R. Varian. "Some FAQs about Usage-Based Pricing". Sep. 14, 1994. <http://www-personal.umich.edu/~jmm/papers/useF,AQs/useFAQs.pdf>.*

(Continued)

*Primary Examiner*—David Wiley
*Assistant Examiner*—George C. Neurauter, Jr.
(74) *Attorney, Agent, or Firm*—Fenwick & West LLP

(57) ABSTRACT

A method and apparatus are disclosed for providing additional information, such as advertisements, to a client device via the response signal to an application (or web) server request. A client device is in communication with a server device, and sends a request for information to the server via a network connection. A device is associated with the network connection that detects and analyzes the signals being exchanged. The device would likely be associated with a point-of-presence to an Internet connection, for an ISP or the like. The associated device sends an appropriately timed reset signal to the server device that prevents the server device from further responding to signals subsequently received from the client device. The associated device sends, in response to the web server request, a response signal to the client device. The response signal provides additional information, along with the originally requested web server material. The additional information, along with the originally requested server materials, might then be displayed in appropriate windows or frames on a client browser. The additional information can be made to reside on a separate server. The associated device might also be used to revoke requests made to certain types of web servers, with a revocation response being provided, or a re-direction being provided to a site containing revocation information.

23 Claims, 9 Drawing Sheets

U.S. PATENT DOCUMENTS

| | | | | |
|---|---|---|---|---|
| 5,315,580 | A | 5/1994 | Phaal | 370/13 |
| 5,351,243 | A | 9/1994 | Kalkunte et al. | 370/92 |
| 5,361,353 | A | 11/1994 | Carr et al. | 395/700 |
| 5,365,514 | A | 11/1994 | Hershey et al. | 370/17 |
| 5,375,070 | A | 12/1994 | Hershey et al. | 364/550 |
| 5,377,196 | A | 12/1994 | Godlew et al. | 371/20.1 |
| 5,430,709 | A | 7/1995 | Galloway | 370/13 |
| 5,446,874 | A | 8/1995 | Waclawsky et al. | 395/575 |
| 5,526,283 | A | 6/1996 | Hershey et al. | 361/514 C |
| 5,528,516 | A | 6/1996 | Yemini et al. | |
| 5,539,659 | A | 7/1996 | McKee et al. | |
| 5,600,632 | A | 2/1997 | Schulman | 370/252 |
| 5,606,688 | A | 2/1997 | McNutt et al. | |
| 5,621,796 | A | 4/1997 | Davis et al. | |
| 5,627,886 | A | 5/1997 | Bowman | 379/111 |
| 5,634,009 | A | 5/1997 | Iddon et al. | |
| 5,644,717 | A | 7/1997 | Clark | 395/200.11 |
| 5,651,006 | A | 7/1997 | Fujino et al. | |
| 5,734,886 | A | 3/1998 | Grosse et al. | |
| 5,751,698 | A | 5/1998 | Cushman et al. | 370/252 |
| 5,781,735 | A | 7/1998 | Southard | 395/200.54 |
| 5,787,253 | A | 7/1998 | McCreery et al. | 395/200.61 |
| 5,812,529 | A | 9/1998 | Czarnik et al. | |
| 5,870,546 | A * | 2/1999 | Kirsch | 709/205 |
| 5,870,557 | A | 2/1999 | Bellovin et al. | 395/200.54 |
| 5,878,420 | A | 3/1999 | de la Salle | 707/10 |
| 5,884,098 | A | 3/1999 | Mason, Jr. | |
| 5,892,903 | A | 4/1999 | Klaus | 395/187.01 |
| 5,917,822 | A * | 6/1999 | Lyles et al. | 370/395.4 |
| 5,933,602 | A | 8/1999 | Grover | 395/200.54 |
| 5,995,628 | A * | 11/1999 | Kitaj et al. | 713/164 |
| 6,041,041 | A | 3/2000 | Ramanathan et al. | |
| 6,044,401 | A | 3/2000 | Harvey | |
| 6,078,908 | A * | 6/2000 | Schmitz | 340/5.28 |
| 6,085,243 | A | 7/2000 | Fletcher et al. | 709/224 |
| 6,108,700 | A | 8/2000 | Maccabbee et al. | |
| 6,141,686 | A | 10/2000 | Jackowski et al. | |
| 6,141,754 | A * | 10/2000 | Choy | 705/52 |
| 6,179,205 | B1 | 1/2001 | Sloan | |
| 6,247,058 | B1 | 6/2001 | Miller et al. | |
| 6,256,739 | B1 * | 7/2001 | Skopp et al. | 713/201 |
| 6,272,535 | B1 * | 8/2001 | Iwamura | 705/26 |
| 6,286,029 | B1 * | 9/2001 | Delph | 709/203 |
| 6,327,242 | B1 * | 12/2001 | Amicangioli et al. | 370/216 |
| 6,343,284 | B1 | 1/2002 | Ishikawa et al. | |
| 6,353,929 | B1 * | 3/2002 | Houston | 725/20 |
| 6,374,266 | B1 | 4/2002 | Shnelvar | |
| 6,426,943 | B1 | 7/2002 | Spinney et al. | |
| 6,438,125 | B1 * | 8/2002 | Brothers | 144/134.1 |
| 6,462,758 | B1 | 10/2002 | Price et al. | |
| 6,629,102 | B1 | 9/2003 | Malloy et al. | |
| 6,651,099 | B1 | 11/2003 | Dietz et al. | |
| 6,665,725 | B1 | 12/2003 | Dietz et al. | |
| 6,721,749 | B1 | 4/2004 | Najim et al. | |
| 6,745,197 | B2 | 6/2004 | McDonald | |
| 6,772,200 | B1 * | 8/2004 | Bakshi et al. | 709/217 |
| 2001/0010059 | A1 | 7/2001 | Burman et al. | |
| 2002/0133412 | A1 * | 9/2002 | Oliver et al. | 705/26 |
| 2002/0161676 | A1 * | 10/2002 | Vadlamani | 705/30 |

FOREIGN PATENT DOCUMENTS

| | | |
|---|---|---|
| JP | 61-230149 | 10/1986 |
| JP | 62-051832 | 3/1987 |
| JP | 64-068835 | 3/1989 |
| JP | 2-44447 | 2/1990 |
| JP | 03-248031 | 11/1991 |
| JP | 03-267627 | 11/1991 |
| JP | 4-64129 | 2/1992 |
| JP | 05-267429 | 10/1993 |
| JP | 6-72218 | 3/1994 |

OTHER PUBLICATIONS

Jeffrey K. MacKie-Mason and Hal R. Varian. "Pricing the Internet". Feb. 10, 1994. <http://www-personal.umich.edu/~jmm/papers/Pricing_the_Internet.pdf>.*

Jeffrey K. MacKie-Mason and Hal R. Varian. "Economic FAQs About the Internet". Jun. 1, 1996. <http://www-personal.umich.edu/~ jmm/papers/FAQs/econ-faqs-mit96-net.pdf>.*

Parker, Tim. "Teach Yourself TCP/IP in 14 Days", Second Edition, Sams Publishing, published Apr. 4, 1996, pp. 18-20, 44-45, 49, and 64-72.*

Howe, Denis. "fault tolerance", Free On-Line Dictionary of Computing, posted Apr. 6, 1995, <http://foldoc.doc.ic.ac.uk/foldoc/foldoc.cgi?fault+tolerance>, 1 page.*

Bay Networks, Chapter 2: SNMP, RMON, GOOTP, DHCP and RARP Concepts, Mar. 1997, 8 pages, http://www.baynetworks.com/library/pubs/html/routers.

Tim Wilson, Sniffer Meets RMON At N+1, http://www.internetwk.com/news1098/news102298-2.thm.

Teresa C. Mann et a., Network Design: Management and Technical Perspectives, CRC Press, Aug. 1998, 9 pages.

Cisco Systems, Inc.: "NetFlow FlowCollector Installation and User Guide," Chapter 5, pp. 5-1-5-8, undated.

Cisco Systems, Inc.: "NetFlow FlowCollector Installation and User Guide," Chapter 6, pp. 6-1-6-28, undated.

Blaze, M.: "NFS Tracing by Passive Network Monitoring", Department of Computer Science, Princeton University, undated.

AG Group, Inc.: "WatchPoint 1.0 Manual", May 1999.

Network General Corporation: "Managing WAN Technologies for Maximum Internetwork Performance, a Network Visibility Guide", Copyright 1996.

Network General Corporation: "An Introduction to the Total Network Visibility Architecture, a Network Visibility Guide", Copyright 1995.

Network Associates, Inc.: "SnifferPRO 98 by Network Associates, Expert Network Analysis for Optimal Performance", Copyright 1998.

NetScout Systems, Inc.: "NetScout Intelligent Probes, End-to-End Monitoring of LANs, WANs, and Switched LANs for Distributed Networks", Copyright 1997.

Precision Guesswork Product Page: "LANWatch32 Network Analyzer for Windows 95/NT, Unlocking the Complexity of Network Analysis", Jun. 4, 1998 Update.

Check Point Software Technologies Ltd.: "Check Point FireWall-1 Technical Overview, Version 4.0", Apr. 1999.

Enger and Reynolds, RFC 1470, http://ftp.cised.unima.it/pub/docs/rfc—unsorted/rfc 1470.txt, pp. 65, 70, 93, 95, 102, 103, 128, 135, 146 and 160, Jun. 1993.

Novell NetWare, Network Computer Products: "LANalyzer for Windows 2.1 User's Guide, Chapter 5", pp. 75-103, Mar. 1994.

Network General: "Expert Sniffer Network Analyzer Operations, Release 4.5", pp. 1-3 through 1-7, 7-3 through 7-26, 6-62 through 6-75, Jan. 1995.

Cisco Systems, Inc.: "Overview of the NetFlow FlowAnalyzer", Copyright 1989-1998.

Cisco Systems, Inc.: "NetFlow FlowCollector Overview, Chapter 1", undated.

Cisco Systems, Inc.: "Release Notes for NetFlow FlowCollector, Release 1.0", Sep. 1997.

Cisco Systems, Inc.: "FlowCollector Overview, Chapter 2", undated.

Cisco Systems, Inc.: "Using the FlowAnalyzer Display Module, Chapter 3", undated.

Jeffrey C. Mogul, "Efficient Use of Workstations for Passive Monitoring of Local Area Networks" (1990) SIGCOMM '90 Symposium, Communications, Architectures & Protocols, Philadelphia, Pennsylvania, pp. 253-263.

Jeffrey C. Mogul, et al., "The Packet Filter: An Efficient Mechanism for User-Level Network Code" (1987) Operating Systems Review, vol. 21, No. 5, Proceedings of the Eleventh ACM Symposium on Operating Systems Principles, Austin, Texas, pp. 39-51.

Robert T. Braden, "A Pseudo-Machine for Packet Monitoring and Statistics" (1988) SIGCOMM '88 Symposium, Communications, Architectures & Protocols, Stanford, California, pp. 200-209.

J. Scott Haugdahl, "Benchmarking LAN Protocol Analyzers" (1988) IEEE Proceedings, 13th Conference on Local Computer Networks, Minneapolis, Minnesota, pp. 375-384.

"Sniffer Network Analyzer Ethernet®—Seven-Layer Expert Analysis of 10/100 Mbps Ethernet Segments", Network Associates, Inc., http://www.nai.com/products/network_visitibility/sniffer_lan/s_nae.asp.

Rachel Emma Silverman, "Intrusion Detection Systems Sniff Out Digital Attack" (Feb. 4, 1999) Wall Street Journal.

N. Michael Minnich, "A Packet Capture System for LAN Software Development" (1986) IEEE Proceedings, 11th Conference on Local Computer Networks, Minneapolis, Minnesota, pp. 68-76.

Duffield, N.G., and Grossglauser, M., "Trajectory Sampling for Direct Traffic Observation," AT&T Labs—Research, pp. 1-14, 2001.

Duffield, N.G., and Grossglauser, M., "Trajectory Sampling for Direct Traffic Observation," AT&T Labs—Research, pp. 1-12, 2000.

Kaliski, B., "The MD2 Message-Digest Algorithm," RSA Laboratories, Network Working Group, Apr. 1992.

Minnich, N. Michael, "A Packet Capture System for LAN Software Development" (1986) IEEE Proceedings, 11th Conference on Local Computer Networks, Minneapolis, Minnesota, pp. 68-76.

Rivest, R., "The MD5 Message-Digest Algorithm," MIT Laboratory for Computer Science and RSA Data Security, Inc., Apr. 1992.

Robshaw, M.J.B., "On Recent Results for MD2, MD4, and MD5," RSA Laboratories' Bulletin, No. 4, Nov. 12, 1996.

* cited by examiner

METHOD AND APPARATUS FOR PROVIDING ADDITIONAL INFORMATION IN RESPONSE TO AN APPLICATION SERVER REQUEST

FIELD OF THE INVENTION

The present invention relates generally to providing (or injecting) information to a client device in response to a web (or application) server request. More specifically, the present invention provides a method and apparatus for returning information, including but not limited to advertisements or the like, via the response signal to a server request. The injected information is then presented to the requesting party, along with the originally requested information, in a convenient format for viewing both sets of information.

BACKGROUND OF THE INVENTION

Growing computer networks are providing clients (also commonly referred to as "users") with convenient access to unprecedented amounts of information. In particular, the Internet allows a client to contact a myriad of web sites that might contain a plurality of web pages, and links to other web pages. The web sites are created and maintained by content providers such as portals, merchants, corporations, agencies, and the like. While many sites are meant to be simply informative, a large number are oriented around some commercial venture. As a result, the intent of such a web site provider is to generate revenue.

Revenue might be generated as a result of the client buying certain products through the web site. The web site provider would then reap profits from the item sold, or be paid a certain amount for offering the item for sale. Other revenue generating schemes include auctions, wherein a web site provider offers goods for bidding, with the highest bidder ultimately purchasing the product. The web site provider then retains a portion of the selling price, or provides the bidding transaction for a fee.

In addition to the example revenue generating schemes described above, advertising is becoming a popular method of generating revenue. Advertising can be added to a web page that is already employing a revenue generation scheme, thereby further increasing any overall revenues. Advertising generally consists of banners or click-through areas (often called "thumbnails") which are located in certain pre-defined areas of a web page. In order for an advertiser to have information appear on a web site or web page, they must generally pay a web site provider for a desired space. The rates paid are usually a function of the visual proximity of the advertisement space, as well as the number of times the ad will appear in that space (e.g. continuously, or periodically).

In many instances, advertising alone has proven to be enough of a revenue generating source so that an Internet connection product (i.e. hardware and/or software) can be offered to a client for free (or at a reduced rate). In exchange for the free product, the client will generally be subjected to certain advertising while using the product. For example, the company FreePC offers a free PC (personal computer) that will impose certain advertising in designated areas of the screen. The advertising changes over time via interaction with the FreePC web site and/or the Internet. However, a certain amount of advertising normally remains visible at all times. With the prices of PCs dropping dramatically, certain users might not wish to subject themselves to such additional advertising in exchange for a free computer. The user may also prefer not to sacrifice usable display screen areas, the areas being taken up by the advertising shown on the screen. Examples include a border around the operating system window, or the like.

Still another Internet connection product that has been offered for free (or reduced rates)—due to resultant advertising revenues—is the actual Internet connection service and related fee. Such fees vary, with a flat rate of approximately $20-22 per month being typical in the industry. For instance, a company called Netzero offers free Internet service if you use their particular Internet connection software. The typical mode of acquiring such software includes downloading it from the Netzero web site. When downloading any software from the Internet, security issues are a concern for the user. The downloaded software resides on the harddisk of the client machine and takes up valuable space. Additionally, the downloaded software might corrupt and destroy files if the download is infected with a virus. Yet another concern involves the general inconvenience of performing the downloading operation. Even at high modem rates, the software needed to perform the Netzero functionality requires more than 25 minutes to download. Still another concern involves the time-consuming, and often intrusive, registration process encountered by a user in order to download and maintain such software. Such inconveniences and concerns might dissuade a user from using the Netzero product, despite the promise of lowered (or waived) monthly access fees.

Accordingly, what is needed in the field is a method and apparatus for providing or injecting information, including advertisements and the like, back to a user's computer (or web browser) in response to a web server request. The approach should not require the user to download any software, or utilize any special hardware. Instead, the approach should be implemented at a point in the network connection that is independent of any particular user setup. The approach should also not impede the transport or speed of data packets being sent across a network connection, particularly if the device associated with the present solution is not functioning. A user might then use this approach through a standard Internet service provider ISP (or the like). The ISP might therefore offer reduced rates for service requests that such injected information associated with the responses to the web server requests.

SUMMARY OF THE INVENTION

To achieve the foregoing, and in accordance with the purpose of the present invention, a method and apparatus is described for injecting information in response to an application server request. More specifically, the present invention provides a solution for returning information, including but not limited to advertisements, in the response signal to a server request. The injected information can then be presented to a requesting party, along with the originally requested information.

According to one representative embodiment of the present invention, an "injector" (or "detector" or "relocator") device is located along a network pathway over which data packets flow between client and server machines. The injector is typically associated with a point-of-presence (POP), which is the location of an access point to the Internet. A signal from the client computer will be analyzed by the injector on its way to the server computer. The signal will travel across the network connection, regardless of whether the injector is functional or not. In response to a synchronization signal from the client, the injector will send a reset command to the server. This causes the server to thereafter not respond to any further requests from the client computer. If a request is sent by the client, it will travel onto the server machine, but no response will be made. Instead, the injector will provide a response that includes a new location for the information desired by the client. This new location will include advertising or other information, along with the location of the originally requested information. The information can be located on a separate information (or advertisement) server that feeds information (or advertisements) back to the client machine according to any of a number of decision processes. A termination request from the client machine to the server machine will result in a reset signal from the injector to the client machine. As a result of this arrangement, the client machine receives both the server request information, along with advertising (or other) information, in response to the original server request sent to the server machine.

In yet another representative embodiment, a client machine will send a server request by first sending a synchronization signal to the server machine. The server machine will respond with a TCP (Transfer Control Protocol) synchronization-acknowledge signal to the client machine, and the client machine will send back an acknowledgement signal. Other protocols besides TCP might also be readily used. A server request is sent thereafter from the client machine to the server machine. This will produce a reset signal from the injector to the server machine. The injector will also send a return code signal for insertion of information (e.g. an advertisement) on the client machine, along with a return code signal for retrieving the original server request on a particular website. The sequence numbers of the return code signal(s) and the response from the server machine to the original server request will be the same. The return code signal will arrive at the client machine before the original response from the server machine. The client machine will use and display the results of this first response, and ignore the second response since it has the same sequence number. The second response will be treated as a packet re-transmission. Any subsequent requests sent from the client machine to the server machine will not produce a response, since the server machine has been reset. A termination request from the client machine to the server machine will result in a reset signal from the injector to the client machine. Again, as a result of this arrangement, the client machine receives both the server request information, along with the injected information, in response to the original server request.

In yet another embodiment, the injector can be used to detect server requests made by a client machine to restricted web sites, such as pornography web servers and the like. The injector can send a reset signal to the web server, which will prevent any further replies from being sent back to the client machine. The injector can send a revocation message to the client machine. The revocation message might also contain a re-direction and/or location of a web site that provides an explanation for the revocation.

Still other embodiments are intended within the scope of the present invention, wherein different representative signals—other than the ones already described—might be detected, sampled, analyzed, re-directed, re-formatted, and/or responded to by the injector device. The device will provide (or inject) responses so that the client machine receives advertising, or other such information, in response to a server request. The original server request, however, is also being handled according to the user's original desires. A typical example would include a client machine requesting a web page from a web site. The present system would provide a return signal that facilitates displaying the requested web page, along with the additional information materials, in appropriate display locations. For instance, advertising material might appear in a separate web browser window. Alternatively, the advertising might appear in a portion of a primary web browser window that is being used to display the requested web page information.

An Internet Service Provider (ISP) can use the present invention to offer reduced rate Internet access to client users. If a client chooses a less expensive (or even free) access service, then the POP used by that client will have at least one injector device associated with it. Information, such as advertisements will be returned to the client in response to their server requests. The revenue generated by the advertising can be used to offset the reduced rates being paid by the client. The rates can be made to vary depending upon the amount of advertising that is returned to a client machine for viewing by the user. Free Internet access might carry with it the burden of more injected information which is sent to the client machine. At the opposite end, clients who pay a full monthly rate will be subjected to no (or less) additional information.

These and other advantages of the present invention will become apparent upon reading the following detailed descriptions and studying the various figures and drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1A:
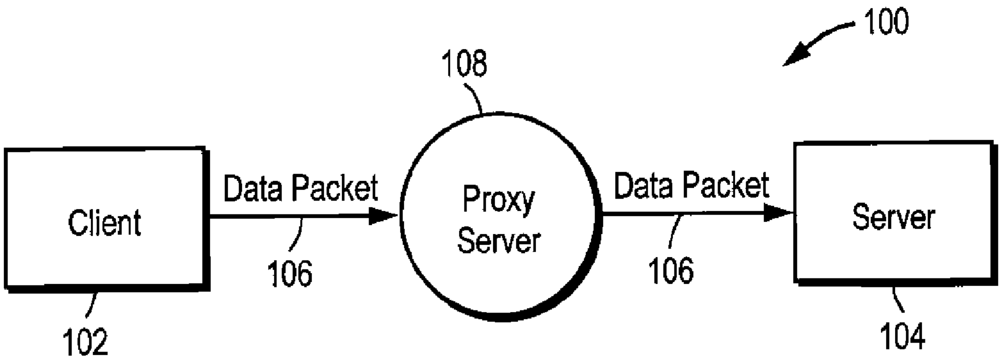
FIG. 1A (Prior Art)
FIG. 1A is a representative prior art block diagram of a data packet being directed through a proxy server.

An invention is described herein for placing (or injecting) information, such as advertising, on a client machine through the received and re-formatted (or re-directed) responses to various server requests. The invention achieves this result without the client having to download or install client-side software (or hardware). A simple request to a target web server—through an access point equipped with the present invention—provides the described information displaying capability. In the following description, numerous specific details are set forth in order to provide a thorough understanding of the present invention. It will be apparent, however, to one skilled in the art, that the present invention may be practiced without some or all of these specific details. In other instances, well known structures and/or process steps have not been described in detail in order to not obscure the intent of present invention.

For ease of discussion, the following detailed description is made with reference to a "injector" device. This device might also be referred to as an "relocator" or "detector" device. The device might consist of a hardware and/or software implementation. It should be kept in mind, as pointed out earlier, that the inventive concepts disclosed herein applying equally well to other types of networks and the signals transmitted therebetween. While reference is made to the representive client and server devices being a computer, a machine, or a web server, other types of data exchanging networked devices are also meant to be included within the scope of the present invention.

In accordance with one aspect of the present invention, an injector (or other such equivalent) device detects and analyzes signals along a network connection path between a client machine and a server machine. The injector device allows the original signal to pass in either direction between the client and server machines. Hence, if the injector device is not functioning, signals will still pass in both directions. The injector device will send reset signals and/or re-formatted and/or re-directed response signals to either of the client or server machines in order to facilitate a desired result at the client machine. A typical desired result includes the displaying of an advertisement on the client machine, in addition to the requested web site material. The advertisement might be displayed on the client machine in a certain window area, with the requested web site material being displayed in another (more primary) window area. The advertisement is supplied to the client machine without the need for any special hardware or software to be added or downloaded on the client machine.

Yet another embodiment of the present invention allows for server requests to be detected and revoked, as necessary. For instance, if a request for a restricted web site is sent by a client machine, then a reset signal is sent to the target server, and the injector device sends a revocation message to the client machine. The client machine might also be redirected to a web site that further explains the revocation.

Referring now to FIG. 1A, a representative block diagram is shown of a prior art configuration 100. In this example, a client (e.g. server or machine or the like) 102 is shown sending a data packet 106 to a server 104. A proxy server is 108 is shown disposed in the path of the data packet 106. Under such a configuration, the proxy server 108 serves as a bottleneck for the server-bound data. Moreover, any data being returned to the client 102 would similarly have to pass through the constraining device 108. If the proxy server 108 is not functioning properly, then the overall flow of data would be adversely affected. If the proxy server 108 fails, then the data flow would cease altogether. A proxy server or the like might be used to affect or alter the data packets flowing back to the client, and therefore provide certain information (e.g. advertisements) on the client device. However, the use of any such device which is disposed within the path of the data flow is not preferred due to the above mentioned constaints.

Figure 1B:
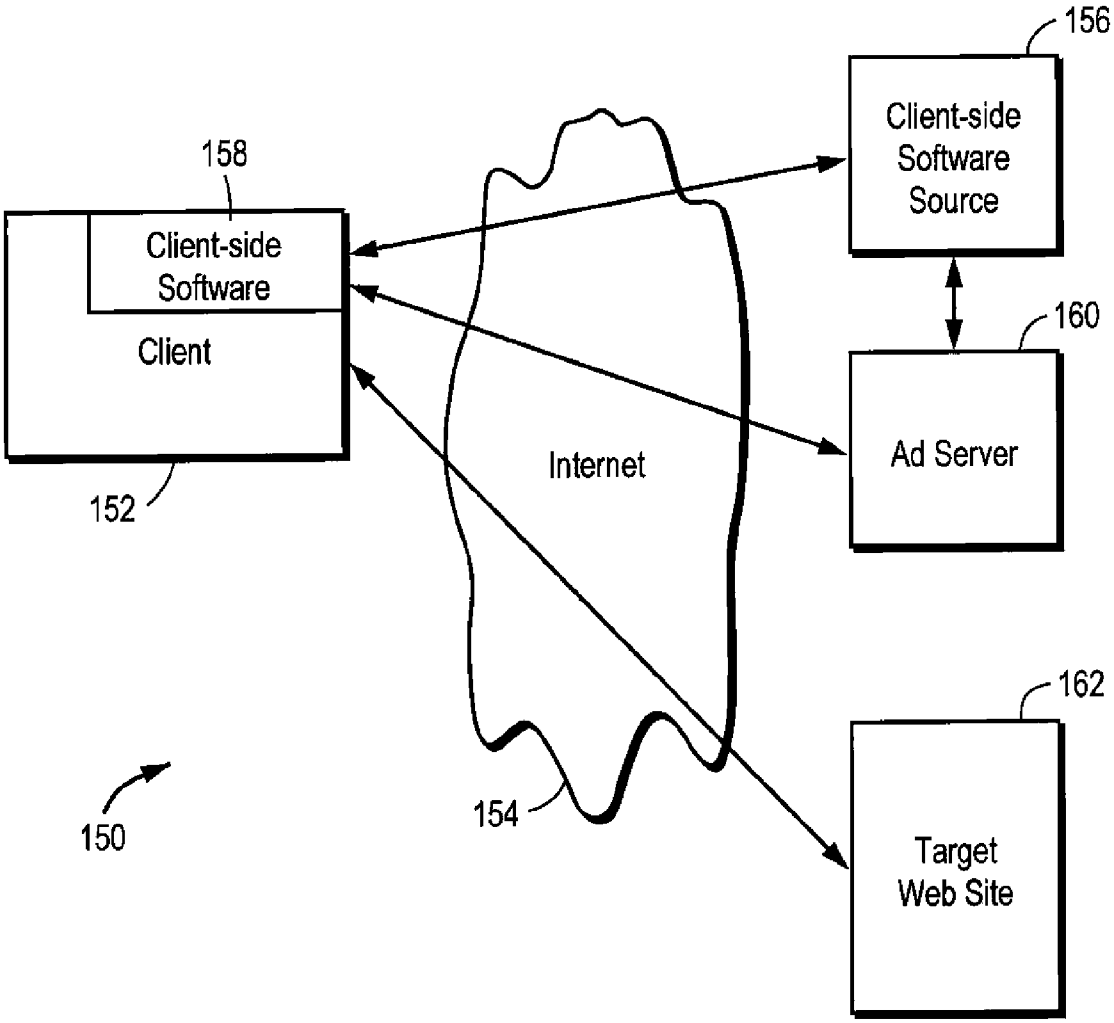
FIG. 1B (Prior Art)
FIG. 1B is a representative prior art block diagram of a system that presents information, such as advertisements, to a client via client-side software.

Referring now to FIG. 1B, a prior art block diagram 150 is shown of certain representative elements which might be found in a system using client-side software or the like. A client device 152 is shown communicating through the Internet 154 (or other such network). The client device 152 might typically include a computer running a web browser like Netscape or Explorer. The client contacts a web site 156 that supplies certain software needed by the client in order to secure a reduced-rate service or product or the like. The client-side software 158 is downloaded onto client device 152, and therein occupies space on the storage medium of the client device. As such, the downloaded software might transport a destructive virus or the like to the client machine. The downloaded software 158 might thereafter be used to display information, such as advertisements, on (or through) the client machine. An ad (or information) server 160 is shown which might store and/or database a variety of advertisements (or information) for retrieval and display on the client machine 152. The client-side software can be used to contact the ad server 160 directly (via an Internet connection) to thereby retrieve advertisements for display on the client machine. Alternatively, the client-side software might contact the software source site 156. The source site 156 would then interact with the ad server 160 to thereafter supply the desired advertisements for display on the client machine.

The client 152 contacts various target web sites 162 and interacts with the website, via HTML (hypertext markup language) or the like, in order to retrieve desired material. This generalized example includes the format used by Netzero (see background section above), wherein Internet access software is downloaded onto the client machine. The client is thereafter subjected to various advertisements via the downloaded software and the connections that the software makes with external sites. The generalized example also resembles the FreePC model (see again background section above) in that the client machine is configured to have client-side software (and/or hardware) which contacts various web sites in order to place advertisements on the client machine. Drawbacks include the need to download software, or have software residing on-board the client machine, in order for the system to be able to place advertisements on the client machine.

Figure 2:
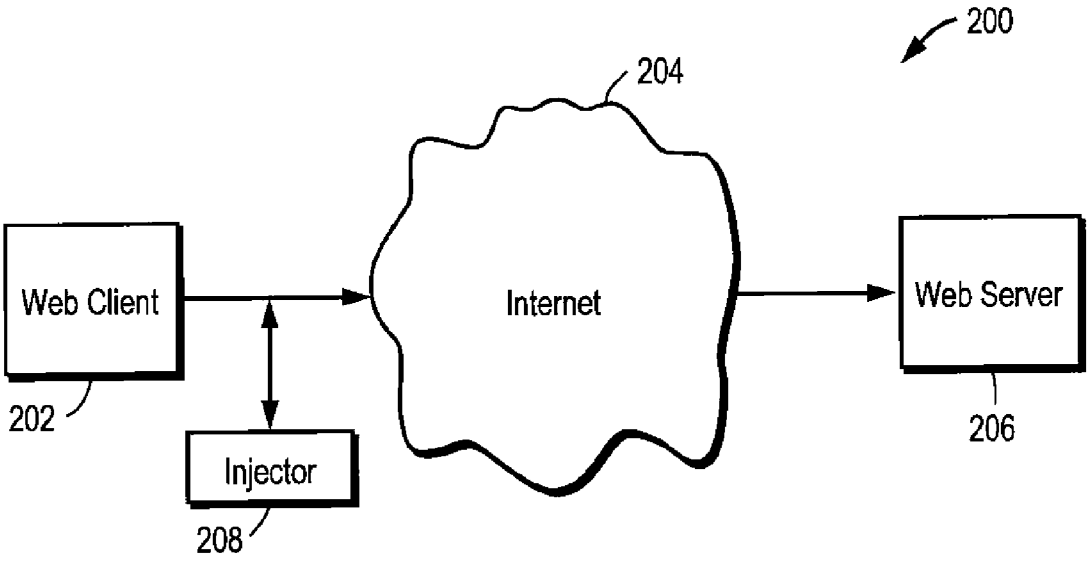
FIG. 2 illustrates, in accordance with one aspect of the present invention, a representative block diagram showing an injector device associated with a network connection between a web client and a web server.

Referring now to FIG. 2, block diagram 200 is shown of certain representative elements that might be used to implement one aspect of the present invention. A web client 202 is shown contacting a web server 206 via a connection through the Internet 204 (or other such network). A "injector" device 208 is shown associated with the network connection, and thereby interacts (or interfaces, or communicates, etc.) with the network connection between the two devices 202 and 206. The injector might be implemented as software, or hardware, or a combination of the two. The injector device does not impede signals transmitted over the network connection path. Yet another appropriate nomenclature might include "detector" device, in that the device detects signals transmitted over the network connection path. The device might also be described as a "relocator" in that the signals provided by the device serve to relocate the user to another device (or server). For ease in describing the invention, the device is generally referred to by one label—that being an "injector" device.

Signals are sampled or analyzed by the injector device 208, and are not impeded in their travel across the associated network connection. In this manner, the traffic will pass normally to its destination regardless of the functional status of the injector device 208. The injector evaluates each signal, and then sends additional signals either to the web server 206, or back to the web client 202. In many instances, the server request (and/or response signal) is directed to a different location or site (and hence the device can be referred to as a "relocator"). Depending upon the signals sent by the injector, and the timing of these signals, an advertisement (or other such information) can be displayed on the client machine 202—along with the originally requested web server material—in response to a request by the web client 202 to the web server 206.

Figure 3:
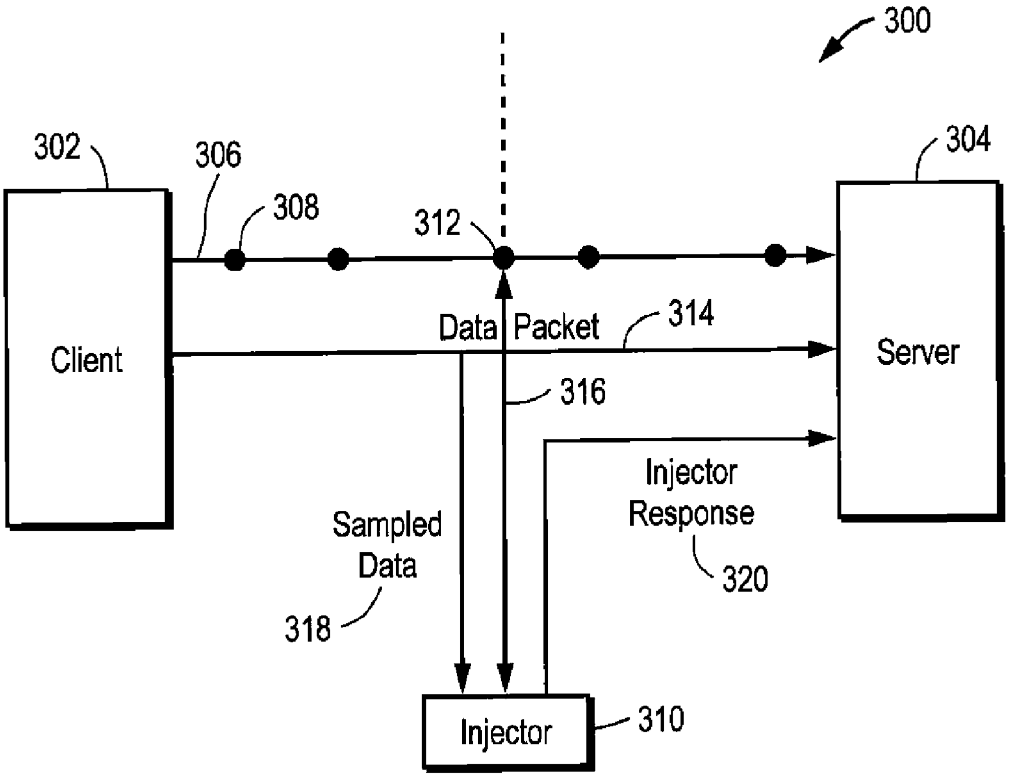
FIG. 3 illustrates, in accordance with one aspect of the present invention, a representative block diagram showing an injector device for analyzing and reacting to data flowing between a network connection between a client and a server.

Referring now to FIG. 3, a block diagram 300 is shown which further details certain representative elements that might be used to implement one aspect of the present invention. A client 302 is shown interacting with a server 304 over a connection path 306. The connection path 306 is shown to include various interface or connection nodes 308. An injector device 310 is shown interacting (or being associated) with the node 312 via connection 316. A data packet (or the like) 314 travels over the connection path 306. The injector 310 samples (and/or detects and/or analyzes) signals or information passing through node 312. An instance of sampled data 318 is shown being directed from the data packet 314 to the injector 310. It should be noted, that the data packet 314 (and others like it) will pass through the node 312, regardless of any subsequent signals sent out by the injector 310. The signal is sensed or analyzed for further actions to be performed by the injector, but the signal is not impeded. The sampled data 318 is thereafter used to produce a response signal 320 from the injector 310. In this instance, the response signal 320 is directed onward to the server 304.

Figure 4:
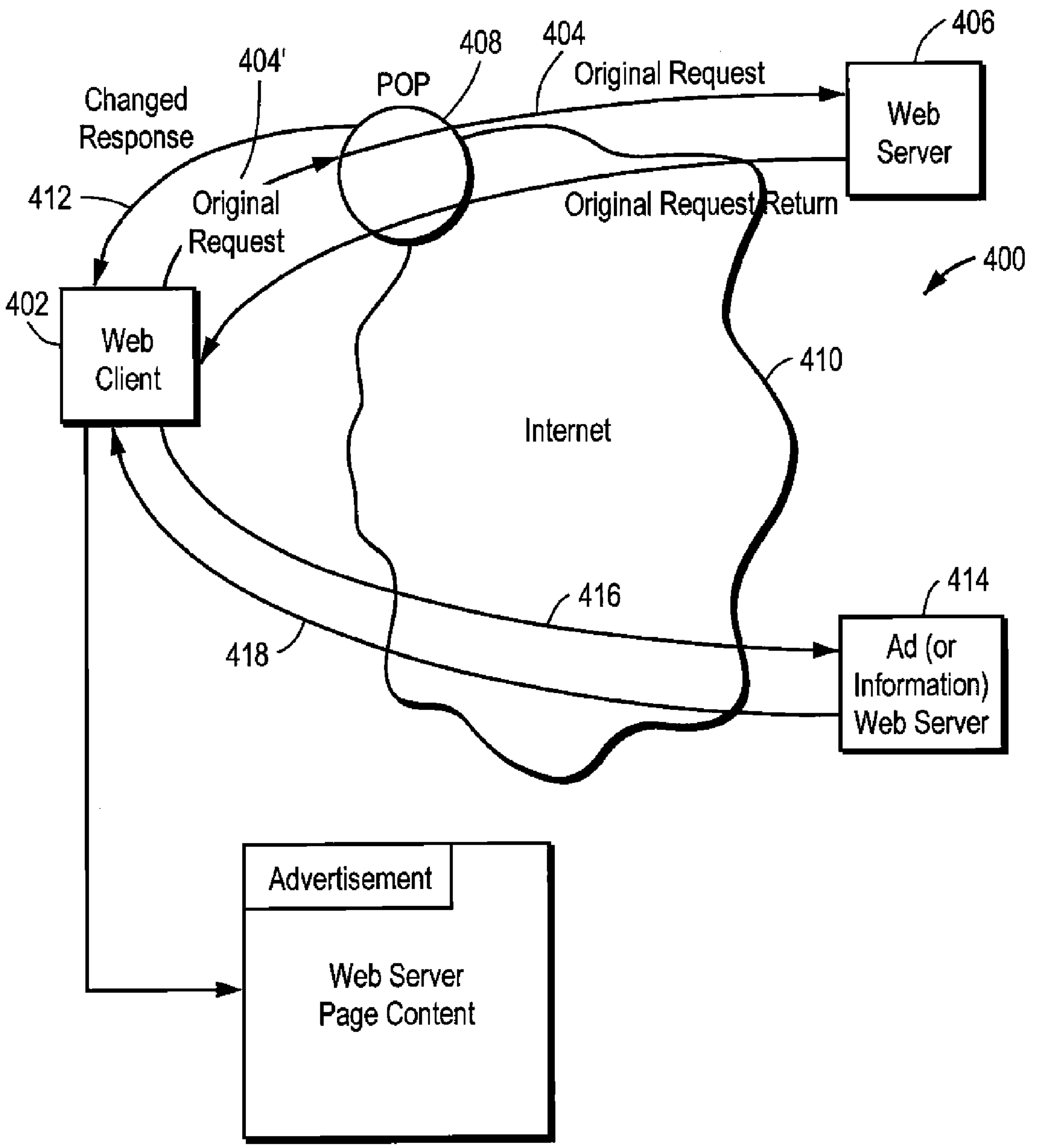
FIG. 4 illustrates, in accordance with one aspect of the present invention, a representative block diagram of an injector device associated with the POP of a network configuration.

Referring now to FIG. 4, a block diagram 400 is shown of certain representative elements that might be used to implement at least one aspect of the present invention. A web client 402 is shown sending a request (labeled "original request") 404 to the web server 406. The request 404 passes through a POP, or point-of-presence 408, and then through the Internet 410. A POP is the location of an access point to the Internet. A typical Internet Service Provider (ISP) or Online Service Provider (OSP) has at least one point-of-presence on the Internet. The number of POPs that an ISP or OSP has is sometimes used as a measure of its overall size and/or growth rate. A POP may reside in communication space that is rented from a telecommunications carrier such as AT&T, Sprint, or the like, and to which the ISP is connected. A POP usually includes routers, digital/analog call aggregators, servers, and also frequently includes frame relay or ATM switches. According to the present invention, the POP includes an injector device configured to sample signals passing through the POP, as similar to FIGS. 2 and 3. In this example, the original request 404' is sampled by the POP with injector 408. The original request is carried on to the web server 406 and produces a return response 410 back to the web client 402. A changed response 412 is also sent from the injector 408 back to the web client 402. The changed response 412 further induces the web client 402 to interact with an advertisement (or general information) web server 414. A request signal 416 is sent to the ad web server 414, and response information 418 relating to an advertisement is thereafter returned. The advertisement information is displayed on the web client 402, along with information relating to the original request return 410.

Figure 5:
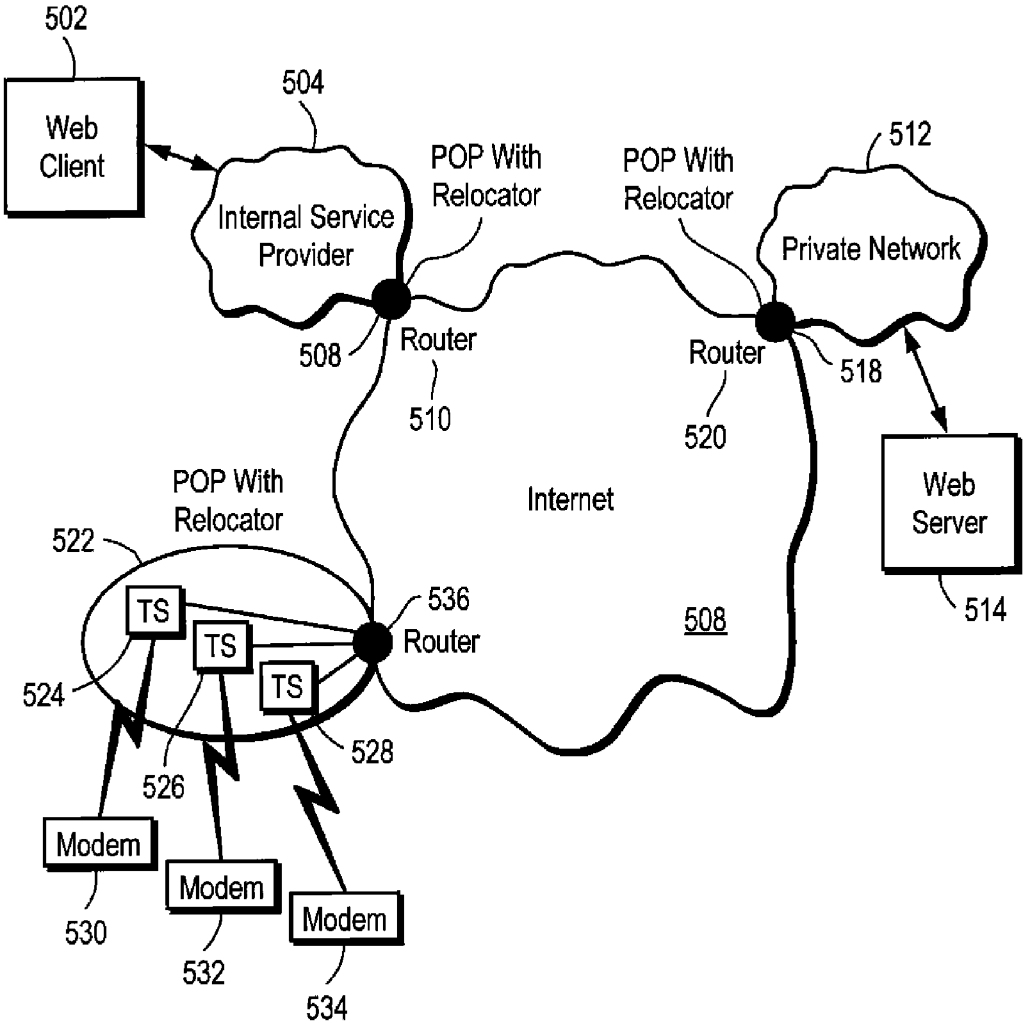
FIG. 5 illustrates, in accordance with one aspect of the present invention, a representative block diagram of an injector device associated with various points on a network configuration.

FIG. 5 shows a block diagram 500 that illustrates certain representative elements comprising a network according to the present invention. The injector described above might be associated with various points on a network. A web client 502 is shown interacting with an Internet Service Provider 504. A POP 506 has an injector device associated with it. A router 510 handles data from the POP for routing within the Internet 508. A private network 512 is shown interacting with a web server device 514. A POP 516 is shown with an associated injector device between the private network 512 and the Internet 508. A router 520 handles data from the POP for routing through the Internet 508. In element 522, a POP with an associated injector is further expanded to show at least one component Terminal Server (TS). Example TSs are shown (524, 526, and 528) that interact via communication links with respective modem devices 530, 532, and 534. The TS devices then interact with a router device 536 that handles data flows to and from the Internet 508.

For an ISP provider such as America Online (AOL) or the like, thousands of POPs might be used, wherein each POP might have redundant connections. An injector device might be associated with each such connection. Many other alternatives are meant to be included within the scope of the present invention, including for instance an injector device associated with each pair of connections, or each trio of connections, and so forth. The amount of injectors to be used would be a function of many factors, including for instance, the cost of the injectors, the desire to provide advertising (or other information) at these various access points, and the desire to offer reduced-rate access services via the revenues generated by such injectors. As an example of the latter point, an ISP might offer Internet access at a fraction of the cost of normal access via connections that have an injector device associated with that connection. Other connections might be left alone for full fee access, and without any extra information being sent to the user. The injector might also be made dynamically variable in its ability to interact with signals and provide information to the client. For instance, the injector might range from providing no information, all the way to a "full" ability wherein supplemental information might be provided in response to each client request to a web server. The variable ability could be set via switches (software/hardware or the like), as controlled by the ISP for its various connections.

Figure 6:
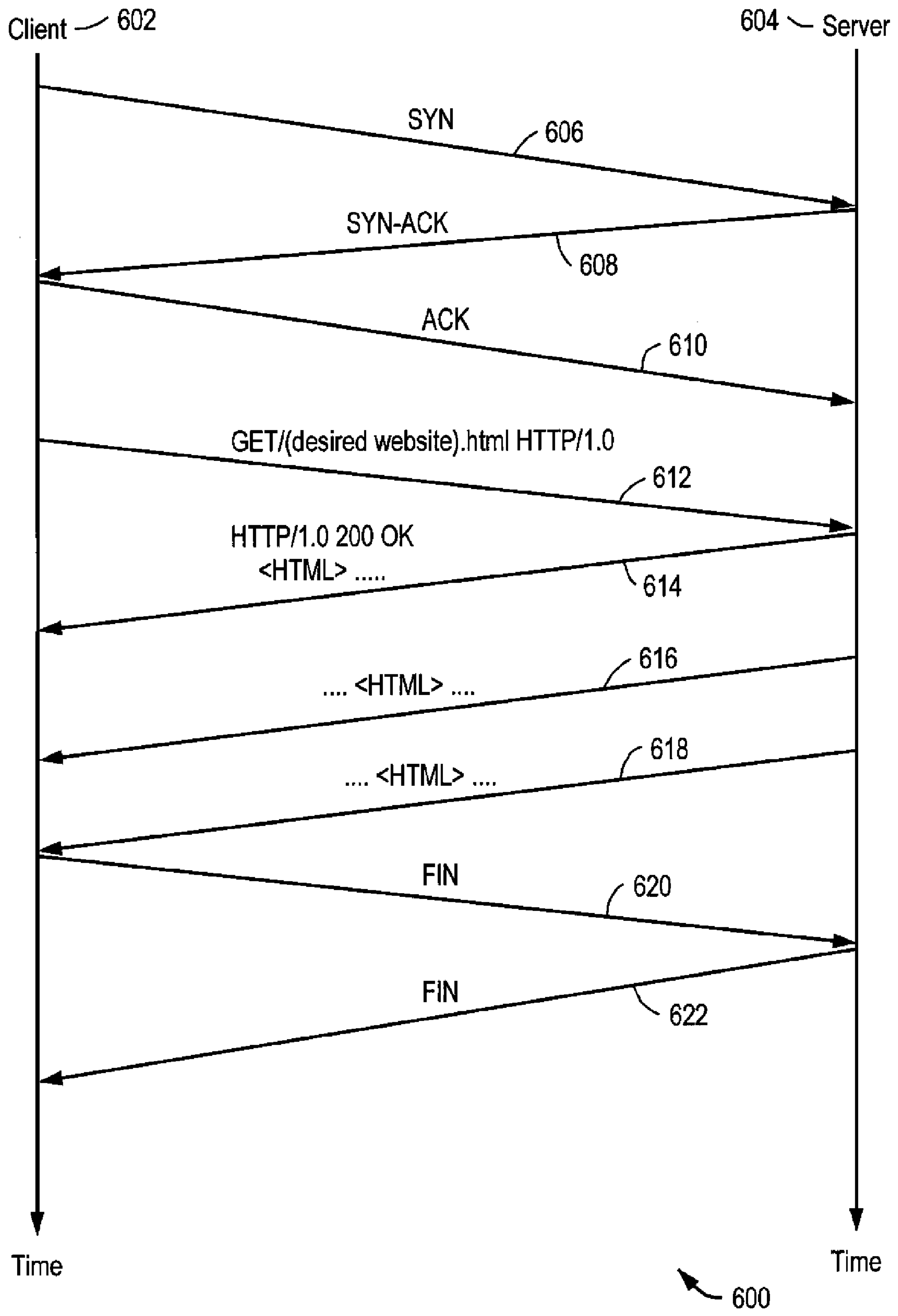
FIG. 6 (Prior Art)
FIG. 6 illustrates, in accordance with one aspect of the present invention, a representive timeline diagram of prior art signals being exchange between a client device and a server device.

Referring now to FIG. 6, a prior art timeline diagram 600 is shown with representative signals that flow between a client side 602 and a server side 604, as a function of time. A TCP synchronization signal (labeled "SYN") 606 is sent from the client side 602 to the server side 604. Other protocols besides TCP might also be used. A synchronization-acknowledge signal (labeled "SYN-ACK") 608 is sent back from the server side 604 to the client side 602. An acknowledge signal (labeled "ACK") 610 is thereafter sent from the client side 602 to the server side 604. Once synchronization has been established, the client side 602 sends a server request 612 to the server side 604. While this request might come in many different forms, example HTTP (Hypertext Transfer Protocol), and HTML coding are shown. HTTP is the set of rules for exchanging files (text, graphic images, sound, video, and other multimedia files) on the World Wide Web. Relative to the TCP/IP (Transfer Control Protocol/Internet Protocol) suite of protocols (which are the basis for information exchange on the Internet), HTTP is an application protocol. Certain concepts pertaining to HTTP include, among other things, the premise that files can contain references to other files whose selection will elicit additional transfer requests. Any web server machine contains, in addition to the HTML and other files it can serve, an HTTP daemon, or a program that is designed to wait for HTTP requests and handle them when they arrive. A client side web browser is an HTTP client, sending requests to server machines. When the browser user enters file requests by either "opening" a web file (e.g. typing in a Uniform Resource Locator or URL) or clicking on a hypertext link, the browser builds an HTTP request and sends it to the Internet Protocol address indicated by the URL. The HTTP daemon in the destination server machine receives the request and, after any necessary processing, the requested file is returned.

Example coding is shown which would contain a request to "Get" certain "desired website" information. While any equivalent coding might be used, the example string might read: GET /kuku.html HTTP/1.0. The server side 604 then responds with HTML information 614, 616, and 618 according the user request, and the subsequent information to be returned from the server side to the client side. Once finished, a "FIN" signal 620 is sent from the client side 602 to the server side 604. The server side responds with a corresponding FIN signal 622 back to the client side 602. According to this example exchange of signals, information is returned from the server side 604 to the client side 602 according the HTML strings 614-618. Any information (advertisements or otherwise), to be supplied to the client side would necessarily be included with this HTML information, as supplied by the contacted site (or links supplied therein).

Figure 7:
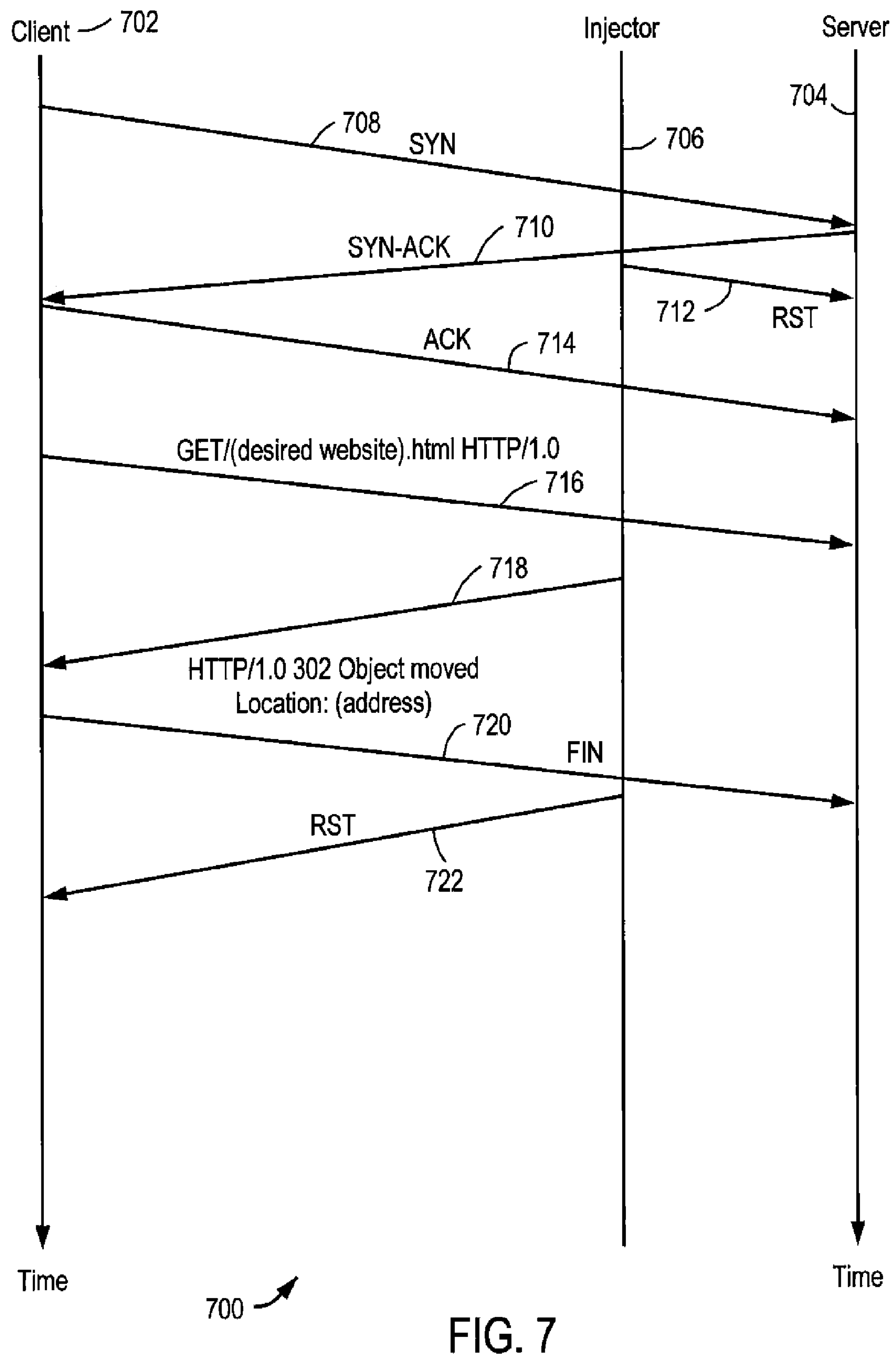
FIG. 7 illustrates, in accordance with one aspect of the present invention, a representative timeline diagram of signals that might be exchanged between a client device, a server device, and the injector device of the present invention.

Referring now to FIG. 7, a timeline diagram 700 is shown of certain representative signals that might be used to implement at least one aspect of the present invention. As before, a client side 702 is shown interacting via a series of signals with a server side 704, as a function of time. A line 706 represents that the signals are analyzed by an injector device. In this example, the injector serves to relocate the site and/or reference from which the client side will retrieve various information. A SYN signal 708 is sent from the client side to the server side. The server side responds with a SYN-ACK signal 710 back to the client side. In this instance, the injector sends a reset signal 712 (labeled as "RST") back to the server side 704. The server side 704 will thereafter not respond to further signals received from the client side 702. An ACK signal 714 is sent from the client side 702 to the server side 704, but because of the RST signal 712, the server does not recognize that synchronization has occurred between the devices.

This reset operation, however, is unknown to the client side 702. Accordingly, the client side 702 sends an HTML (or other type) request 716 to the server side 704 to "Get" certain "desired website" information. A specific embodiment of this string might read: GET /kuku.html HTTP/1.0. This signal is analyzed by the injector 706 on its way to the server side 704. No response is offered by the server side 704 because of the reset signal 712. The injector, however, sends a signal 718 back to the client side 702 that indicates the desired object has moved. A location address is provided, and the client side will continue thereafter to interact with that new location. One specific example of such code might read:

```
HTTP/1.0 302 Object moved
Location:http//adserv/rel.cgi?par=www.kuku.com/kuku-.html
```

Still other re-direction code might be implemented in the form of a function callup, for instance:

```
<HTML>
<HEAD>
</HEAD>
<SCRIPT LANGUAGE=javascript>
function redirect(URL)
{
window.open('http://adserv/redirect/banner.asp?Url='+
  URL, 'AdBanner', 'width=500, height=64,
  resizable=no, top=10, left=10');
}
<SCRIPT>
<BODY on Load="redirect('http://www.kuku.com');">
</BODY>
</HTML>
```

As per the present invention, this new location will include information, such as advertisement material and the like (via the ad server represented by "adserv"), along with the originally requested site materials (represented by www.kuku.com/kuku.html). The transaction is completed via a FIN signal 720 being sent from the client side 702 to the server side 704. The server side 704 will not respond (due to the RST signal 712), and the injector thereby sends a RST signal 722 back to the client side 702.

Figure 8:
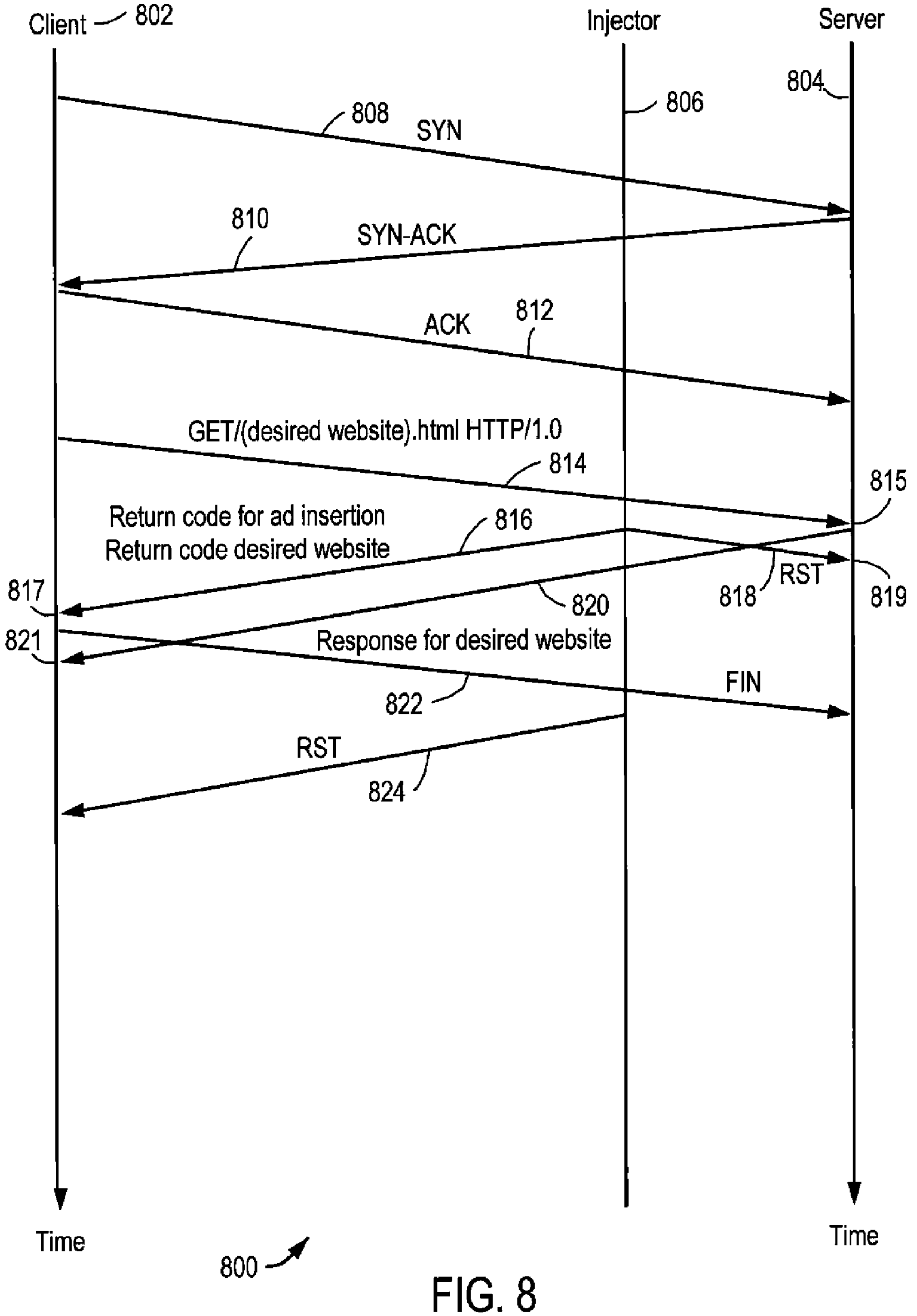
FIG. 8 illustrates, in accordance with one aspect of the present invention, a representative timeline diagram of signals that might be exchanged between a client device, a server device, and the injector device of the present invention.

Referring now to FIG. 8, a timeline diagram 800 is shown of certain representative signals that might be used to implement at least one aspect of the present invention. As before, a client side 802 is shown interacting via a series of signals with a server side 804, as a function of time. A line 806 represents that the signals are sensed or analyzed by an injector device. In this example, the injector serves to insert certain information into the stream of signals so that such information can be displayed on the client side 802, along with any originally requested server side information. Synchronization is established as similar to FIG. 6. A SYN signal 808 is sent from the client side 802 to the server side 804. A SYN-ACK signal 810 is sent from the server side to the client side, and an ACK signal 812 is thereafter sent back to the server side. In this example, synchronization has been established and the server side 804 will thereafter respond to client side signals.

The client side 802 sends a request signal 814 to get desired website information. As described above, this signal will consist generally of a request to "get" certain "desired website" information via HTTP/HTML (or other type) coding. Given that synchronization has been established, a response signal 820 is sent from the server side 804 to the client side 802. The injector, however, uses the "get" request as a trigger to send a RST signal 818 to the server side 804. On the timeline, the "get" request arrives at the server side at the timeline point 815, and the RST signal 818 arrives at timeline point 819. The injector also uses the "get" request as a trigger to send a certain return code for insertion of information, and also a certain return code for retrieving the originally desired website information. While this code might be in any form that achieves the intended result described by the present invention, one example of such coding might include:

```
HTTP/1.0 200 OK
<HTML>
<FRAMESET>
<FRAME src=http://adserv/rel.cgi?par=www.kuku.com/kuku.htm>
<FRAME src=http://www.kuku.com/kuku.htm>
</FRAMESET>
<HTML>.
```

The injector response signal 816 from the injector 806 arrives at the client side 802 at timeline point 817, and has a certain sequence number associated with the signal. The server side response signal 820 arrives at the client side 802 at timeline point 821, after the arrival of injector response signal 816. The response signal 820 will have the same sequence number associated with it as that of the injector response signal 816. As a result, the client side 802 will disregard the second response signal in time. Since a response signal (816) has already been received that has the required sequence number, the second received response signal (821) will be treated as retransmitted (or a repeat) signal that is not needed by the client side. The signal 820 will therefore be discarded, with the client side 802 acting upon the code in signal 816.

The client side 802 will act upon the code in any manner specified by the commands contain within. In this particular example, the first frame (or window) is established with advertisement information from a source ad server. A second frame (or window) is established with the information originally requested by the client side user. A FIN signal 822 is sent by the client side 802 in response to the receipt of the desired information, as contained in signal 816. The injector 806 uses this signal as an trigger to send a RST signal 824 back to the client side 802, thereby completing this particular interaction between the client side 802 and the server side 804.

Figure 9:
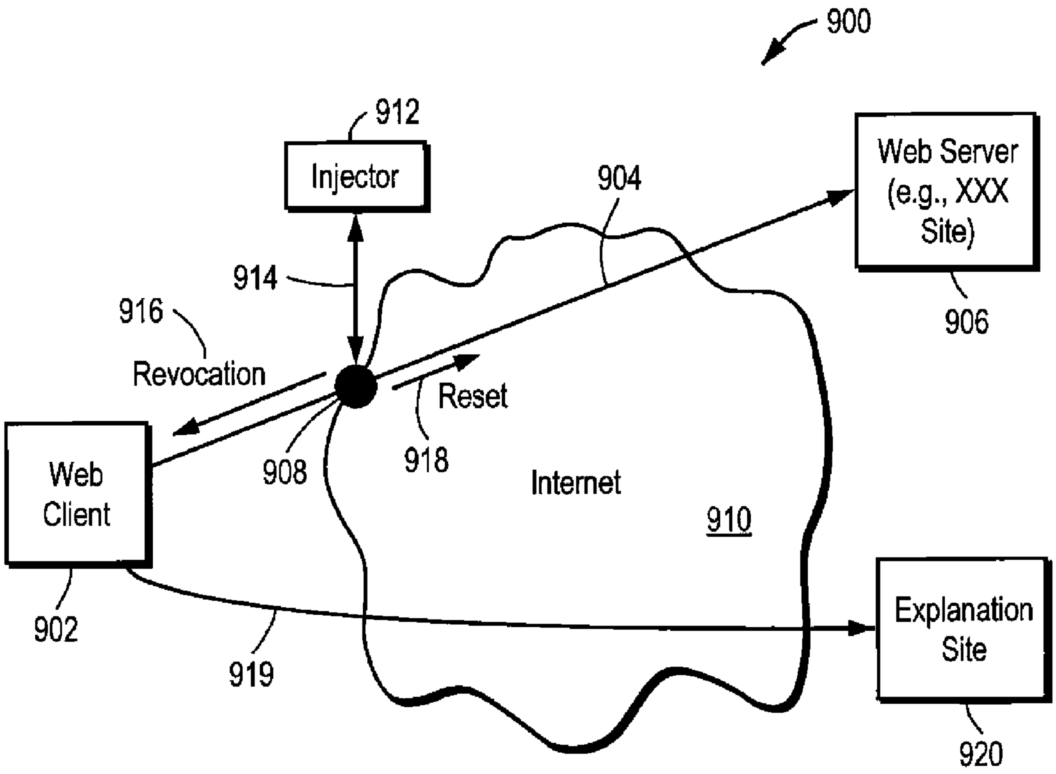
FIG. 9 illustrates, in accordance with one aspect of the present invention, a representative block diagram of an injector device between used to restrict access to a certain type of web site.

Referring now to FIG. 9, block diagram 900 is shown of certain representative elements that might be used to implement yet another aspect of the present invention. A web client 902 is shown that sends a request 904 to a web server 906 via the Internet (or other such network) 910. An injector 912 interacts with an access point 908 via connection 914. As described generally above, the request passes (unimpeded) through the Internet to the web server 906. The injector 912, however, might be configured to detect requests to certain websites, or types of websites, that are deemed "forbidden" or not accessible by that particular web client 902 (e.g. a pornographic or XXX site). If the site is deemed of a certain type, then a reset signal 918 is sent from the injector 912 to the website 906. A revocation response 916 is sent from the injector 912 to the web client 902. Note that as described above, the web server 906 will send a response signal back to the web client 902 before the reset signal 918 is received. However, the web client 902 will drop the second response as a repeat signal, given that the revocation signal 916 provided the response with the sequence number expected by the web client 902. The revocation response 916 might also be configured to provide a relocation to an explanatory website 920 via connection path 919. The explanatory website 920 might provide information to the web client 902 explaining the restriction imposed.

Figure 10A:
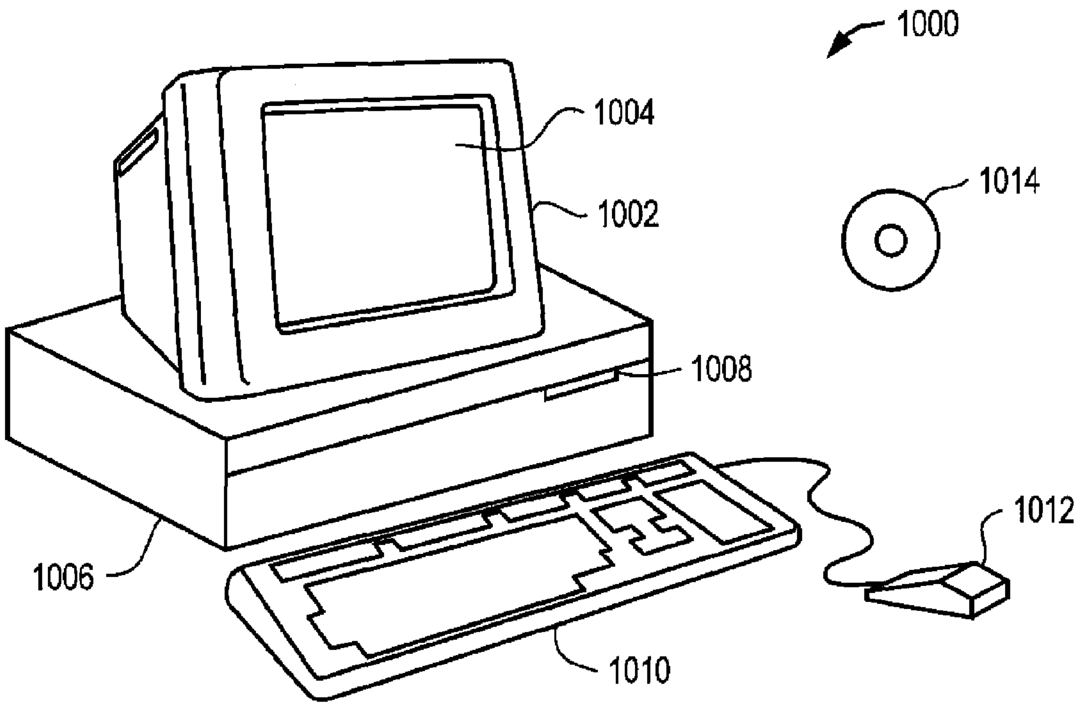
FIGS. 10A and 10B illustrate, in accordance with one aspect of the present invention, a a computer system suitable for implementing embodiments of the present invention.
Figure 10B:
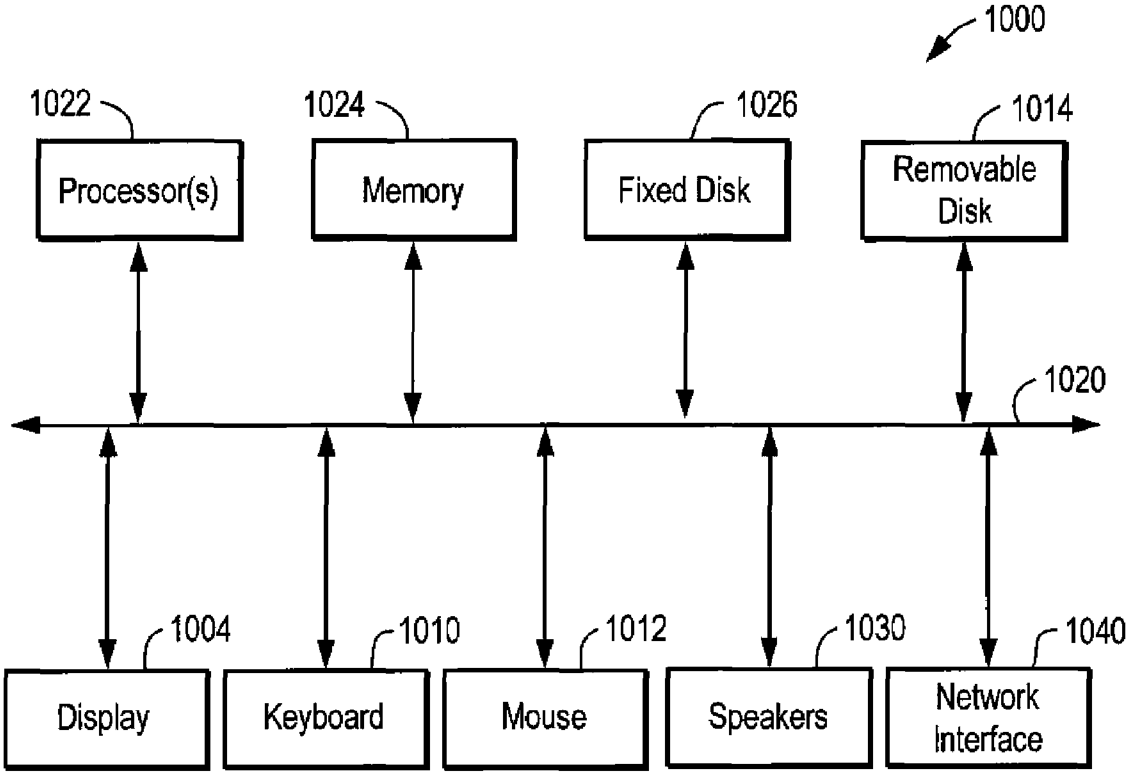

FIGS. 10A and 10B illustrate a computer system 1000 suitable for implementing embodiments of the present invention. FIG. 10A shows one possible physical form of the computer system. Of course, the computer system may have many physical forms ranging from an integrated circuit, a printed circuit board and a small handheld device up to a huge super computer. Computer system 1000 includes a monitor 1002, a display 1004, a housing 1006, a disk drive 1008, a keyboard 1010 and a mouse 1012. Disk 1014 is a computer-readable medium used to transfer data to and from computer system 1000.

FIG. 10B is an example of a block diagram for computer system 1000. Attached to system bus 1020 are a wide variety of subsystems. Processor(s) 1022 (also referred to as central processing units, or CPUs) are coupled to storage devices including memory 1024. Memory 1024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1026 is also coupled bi-directionally to CPU 1022; it provides additional data storage capacity and may also include any of the computer-readable media described below. Fixed disk 1026 may be used to store programs, data and the like and is typically a secondary storage medium (such as a hard disk) that is slower than primary storage. It will be appreciated that the information retained within fixed disk 1026, may, in appropriate cases, be incorporated in standard fashion as virtual memory in memory 1024. Removable disk 1014 may take the form of any of the computer-readable media described below.

CPU 1022 is also coupled to a variety of input/output devices such as display 1004, keyboard 1010, mouse 1012 and speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon CPU 1022 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the representative computer is intended to include, among other things a server and its functional equivalents. Therefore, the described embodiments should be taken as illustrative and not restrictive, and the invention should not be limited to the details given herein but should be defined by the following claims and their full scope of equivalents.

What is claimed is:

1. A method for use in a detector device for controlling access to information on a network including a plurality of interconnected devices, the detector device coupled to the network between a first device and a second device, the method comprising:

monitoring, independent of the first device and the second device, a plurality of request signals between the first device and the second device in the network, at least one request signal including a user identification parameter;

determining whether a user identified by the user identification parameter in the at least one request signal is permitted access to data being requested;

comparing a predetermined parameter associated with the user with a predetermined parameter associated with the data to determine permission to access the data; and generating a response to the request signal to alter communications between the first device and the second device in response to the comparison providing a first result and to not alter communications between the first device and the second device in response to the comparison providing a second result, the detector device allowing the plurality of request signals to pass uninterrupted between the first device and the second device regardless of the first result or the second result in response to the detector device transmitting a non-impedance signal to the first device or the second device, the non-impedance signal transmitted in response to an operational failure of the detector device, the operational failure comprising a non-functioning operation.

2. The method of controlling access of claim 1, wherein the generated response comprises allowing access to the data when the predetermined parameter associated with the user is greater than or equal to the predetermined parameter associated with the data.

3. The method of controlling access of claim 1, wherein the generated response comprises allowing access to the data when the predetermined parameter associated with the user is less than or equal to the predetermined parameter associated with the data.

4. The method of claim 1, wherein the generated response comprises re-directing the request signal to a third device in response to the predetermined parameter associated with the user being less than the predetermined parameter associated with the data, the third device allowing for a re-setting of the predetermined parameter associated with the user to a new parameter comprising a value greater than or equal to the predetermined parameter associated with the data.

5. The method of claim 1, wherein the predetermined parameter associated with the user is one from a group consisting of a positive monetary value, a positive time value, a bandwidth value, a quality of service value, and a content rating.

6. The method of claim 5, further comprising allowing access to one from a group comprised of voice data, video data, and a real-time application in response to at least one of the bandwidth value or the quality of service value being greater than or equal to a threshold parameter.

7. The method of claim 1, further comprising providing access to a second data that does not require a parameter value in response to either the predetermined parameter associated with the user being less than or equal to the predetermined parameter associated with the data or the user not having permission to access the data.

8. A network-based billing method for use in a detector device for providing access to resources on a network, the detector device coupled to the network such that the detector device does not introduce a point of failure, the method comprising:

monitoring, independent from the resources, a data signal from a device on the network, the data signal including a request for a resource;

identifying a value for accessing the resource;

associating a user identification with the data signal;

determining whether a user identified by the user identification is permitted access to the resource;

identifying a credit balance for the user identification;

comparing the credit balance with the value to determine whether access to the resource is permissible;

in response to the comparison, determining a response to the request for the resource; and in response to an operational failure within the detector device, transmitting from the detector device a non-impedance signal to at least one of the resources to allow data signals to pass uninterrupted between the resources on the network, the operational failure comprising a non-functioning operation.

9. The method of claim 8, further comprising allowing access to the resource in response to the credit balance being less than or equal to a cost of preventing access to the resource.

10. The method of claim 8, further comprising allowing access to the resource in response to the credit balance being greater than or equal to a cost of preventing access to the resource.

11. The method of claim 8, further comprising re-directing the data signal to a second resource in response to the credit balance being less than the value, the second resource configured to allow for increasing the credit balance.

12. The method of claim 8, further comprising providing access to a second resource having no cost in response to the credit balance being less than the value.

13. The method of claim 8, wherein the value comprises one from a group consisting of a monetary value, a quality of service value, a bandwidth value, a time value, and a content rating value.

14. The method of claim 8, further comprising passing the data signal to a second device having the resource.

15. A detector device to control access to information on a network including a plurality of interconnected devices, the device comprising:

a processing unit within the detector device coupled to the network between a first device and a second device, the detector device independent of the first device and the second device, the processing unit configured to execute instructions that when executed cause the processor to:

monitor a plurality of request signals between the first device and the second device in the network, at least one request signal including a user identification parameter;

determine whether a user identified by the user identification parameter in a request signal of the plurality of request signals and associated with the first device is permitted access to data associated with the second device;

compare a predetermined parameter associated with the user with a predetermined parameter associated with the data to determine permission to access the data;

transmit a response to the request signal of the plurality of request signals in response to the comparison; and transmit a non-impedance signal to the first device or the second device, the non-impedance signal to allow the plurality of request signals to pass uninterrupted between the first device and the second device in response to an operational failure within the detector device, the operational failure comprising a non-functioning operation.

16. The device of claim 15, wherein the processing unit is further configured to execute instructions to cause the processor to permit access to the data when the predetermined parameter associated with the user is greater than or equal to the predetermined parameter associated with the data.

17. The device of claim 15, wherein the processing unit is further configured to execute instructions to cause the processor to permit access to the data when the predetermined parameter associated with the user is less than or equal to the predetermined parameter associated with the data.

18. The device of claim 15, wherein the processing unit is further configured to execute instructions to cause the processor to re-direct the request signal of the plurality of request signals to a third device in response to the predetermined parameter associated with the user being less than the predetermined parameter associated with the data, the third device allowing for a re-setting of the predetermined parameter associated with the user to a new parameter comprising a value greater than or equal to the predetermined parameter associated with the data.

19. The device of claim 15, wherein the predetermined parameter associated with the user is one from a group comprising a positive monetary value, a positive time value, a bandwidth value, a quality of service value, and a content rating.

20. The device of claim 19, further comprising instructions to cause the processor to permit access to one from a group comprised of voice data, video data, and a real-time application in response to at least one of the bandwidth value or the quality of service value being greater than or equal to a threshold parameter.

21. The method of claim 1, wherein the non-impedance signal comprises at least one of a reset signal, a re-format signal, a re-direct signal, or a combination thereof.

22. The method of claim 8, wherein the non-impedance comprises at least one of a reset signal, a re-format signal, a re-direct signal, or a combination thereof.

23. The detector device of claim 15, wherein the non-impedance signal comprises at least one of a reset signal, a re-format signal, a re-direct signal, or a combination thereof.

* * * * *